United States Patent [19]

Inuiya et al.

[11] Patent Number: 4,980,769
[45] Date of Patent: Dec. 25, 1990

[54] SOLID-STATE ELECTRONIC IMAGING DEVICE HAVING A HIGH SPEED REVERSE TRANSFER

[75] Inventors: Masafumi Inuiya; Yukio Hagino; Jun Inada, all of Tokyo, Japan

[73] Assignee: Fuji Photo Film Co., Ltd., Kanagawa, Japan

[21] Appl. No.: 289,301

[22] Filed: Dec. 23, 1988

[30] Foreign Application Priority Data

Dec. 25, 1987 [JP] Japan ................. 62-327493

[51] Int. Cl.$^5$ ............................................. H04N 3/14
[52] U.S. Cl. ..................... 358/213.19; 358/213.23
[58] Field of Search .................. 358/213.26, 213.19, 358/213.11, 909, 213.29, 213.23

[56] References Cited

U.S. PATENT DOCUMENTS

| 3,931,463 | 1/1976 | Levine | 358/213.19 |
| 4,651,215 | 3/1987 | Bell et al. | 358/213.26 |
| 4,689,687 | 8/1987 | Koike et al. | 358/213.29 |
| 4,783,702 | 11/1988 | Sone et al. | 358/213.19 |
| 4,835,616 | 5/1989 | Morcom | 358/909 |

Primary Examiner—Stephen Brinich

[57] ABSTRACT

A solid-state electronic imaging device is provided that is capable of a transfer and a reverse transfer of signal electric charge. When conducting the reverse transfer of the signal electric charge, a reverse transfer signal is supplied to each set of a predetermined number of consecutive electrodes so that the reverse transfer will be produced at a high speed.

14 Claims, 6 Drawing Sheets

SOLID-STATE ELECTRONIC IMAGING DEVICE HAVING A HIGH SPEED REVERSE TRANSFER

BACKGROUND OF THE INVENTION

The present invention relates to a solid-state electronic imaging device employed, for example, in an electronic still camera (a still video camera) and a video camera.

In a solid-state electronic imaging device including a charge transfer element such as a charge-coupled device (CCD), when a reverse transfer of electric charge is achieved, a reverse transfer signal is applied to an electrode of the charge transfer element. In order to effect the reverse transfer of the signal charge at a high speed, it is required to output a reverse transfer signal having a high speed (a high frequency) from a driver circuit to the charge transfer element. Since the amount of power thus consumed is proportional to the frequency of the reverse transfer signal, the high-speed reverse transfer signal increases the power consumption to be increased.

SUMMARY OF THE INVENTION

It is therefore an object of the present invention to provide a solid-state electronic imaging device capable of accomplishing a reverse transfer in a short period of time without an operation for supplying a high-speed reverse transfer signal thereto being necessary.

According to the present invention, there is provided a solid-state electronic imaging device including a plurality of photoelectric converter elements arranged in a two-dimensional array on a substrate, vertical transfer sections each for transferring or reversely transferring signal charge that have undergone a photoelectric conversion in the photoelectric converter elements when a transfer signal or a reverse transfer signal is supplied to each electrode, and a horizontal transfer section for transferring in a horizontal direction the signal charge inputted from the vertical transfer sections. The device is characterized by including a reverse transfer drive circuit operative in a reverse transfer of the signal charge for supplying the reverse transfer signal to a predetermined number of successive electrodes of the vertical transfer sections.

As described above, for the reverse transfer, the reverse transfer signal is supplied to a predetermined number of consecutive electrodes. As a result, an effect is obtained when the reverse transfer signal having a predetermined multiple of frequency is supplied therefor, and a high-speed reverse transfer can be achieved without increasing the frequency of the reverse transfer signal.

BRIEF DESCRIPTION OF THE DRAWINGS

The present invention will be apparent from the following detailed description taken in conjunction with the following drawings in which.

DESCRIPTION OF THE PREFERRED EMBODIMENTS

Figure 1:
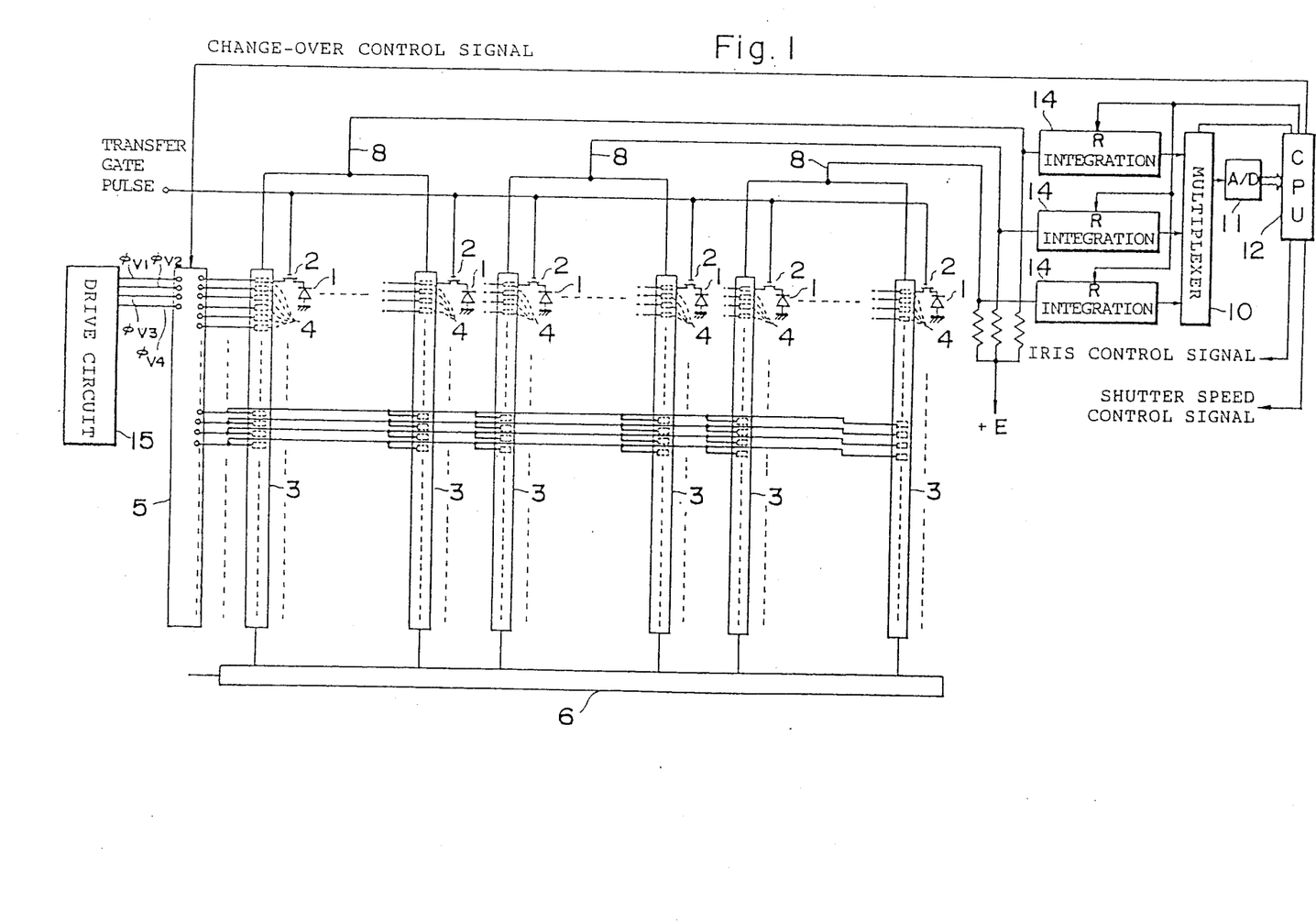
FIG. 1 is a circuit diagram showing an embodiment of the solid-state electronic imaging device according to the present invention.

FIG. 1 shows an embodiment of the solid-state electronic imaging device according to the present invention in which the device is applied to an electronic still camera. The solid-state electronic imaging device includes a plurality of photodiodes (photoelectric converter elements) 1 arranged along the vertical and horizontal directions, vertical CCDs (vertical transfer sections) 3 respectively arranged adjacent to the respective vertical columns of the photodiodes 1, transfer gates 2 disposed between the photodiodes 1 and the vertical CCDs 3 for transferring signal electric charge accumulated in the photodiodes 1 to the vertical CCDs 3 when a transfer pulse is applied thereto, a horizontal CCD (horizontal transfer section) 6 connected to an end (output terminal) of each vertical CCD 3, and an output section (amplify circuit) 7 connected to the output side of the horizontal CCD 6. This configuration is a solid-state electronic imaging element of a so-called inter-line transfer system.

All transfer gates 2 are supplied via the gate signal lines with a transfer gate pulse at the same time so as to enable the transfer gates 2.

The solid-state electronic imaging device of this embodiment is of a four-phase drive type, namely, a drive circuit 15 outputs four-phase transfer signals $\phi hd v1, \phi_{v2}, \phi_{v3}$, and $\phi_{v4}$. The transfer signals $\phi_{v1}$ to $\phi_{v4}$ are supplied via the change-over circuit 5 to the electrodes of the vertical CCDs 3. Consequently, the signal charge transferred from the photodiodes 1 to the vertical CCDs 3 when the transfer gates 2 are enabled is sequentially transferred through the vertical CCDs 3 in a direction toward the vertical CCDs 6.

This solid state electronic imaging device is also capable of effecting a reverse transfer of the signal charge. In the reverse transfer operation, as will be described later, the change-over circuit 5 produces reverse transfer signals based on the transfer signals $\phi_{v1}$ to $\phi_{v4}$ which are supplied to the vertical CCDs 3 and cause the signal charge to be transferred through the vertical CCDs 3 in a direction opposite to the direction above, thereby discharging the signal charge.

Figure 2:
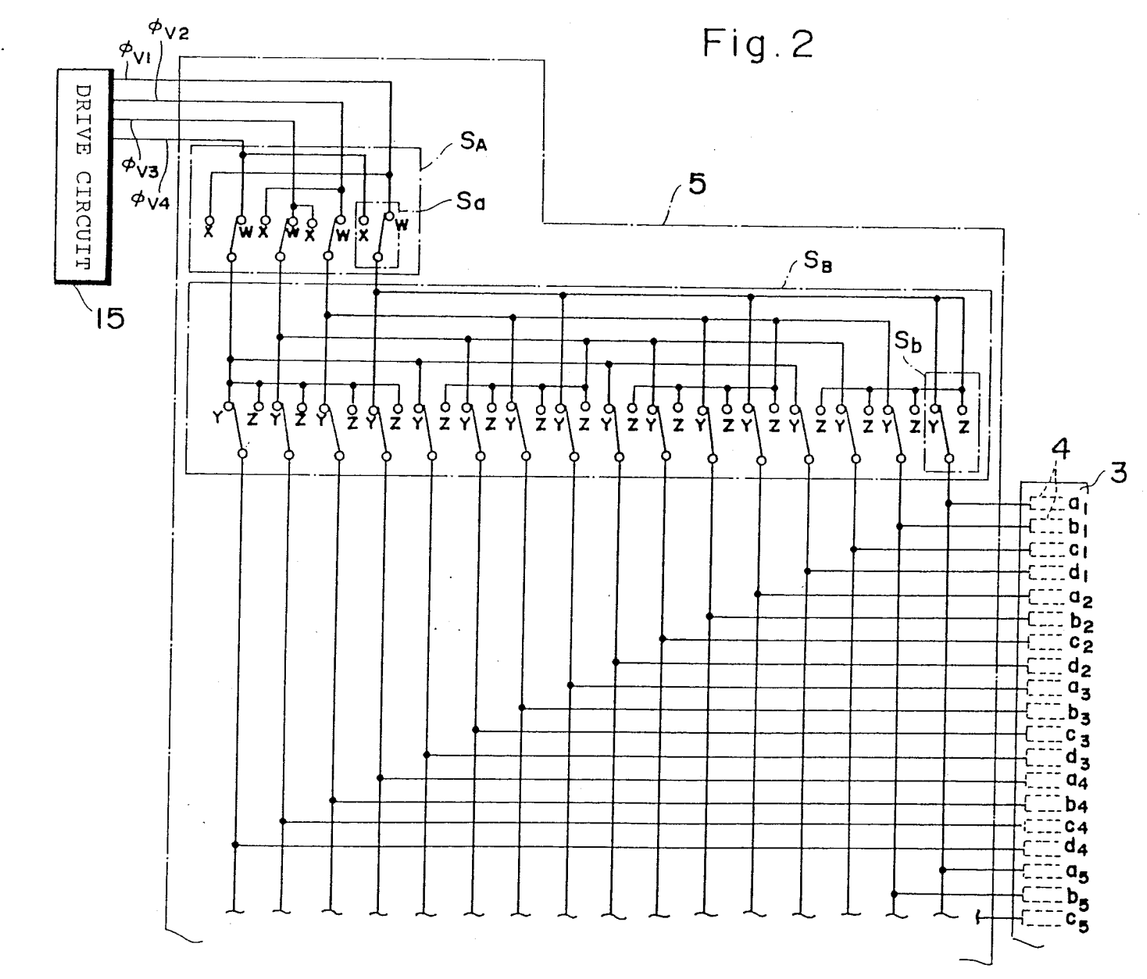
FIG. 2 is a wiring diagram of a change-over circuit.

FIG. 2 is a wiring diagram showing an example of a configuration for the change-over circuit 5. The vertical CCDs 3 are of the 4-phase drive type as described above and there are disposed four electrodes $a_n$, $b_n$, $c_n$, and $d_n$ (n = 1, 2, 3, . . .) for each pixel.

The change-over circuit 5 includes a group $S_A$ of transfer/reverse transfer change-over switches connected to the output side of the drive circuit 15 and a group $S_B$ of electrode change-over switches connected to the output side of the switch group $S_A$. The transfer/reverse transfer change-over switch group $S_A$ is disposed to effect a change-over operation between the transfer and the reverse transfer of the signal charge and includes therein four change-over switches Sa. The electrode change-over switch group $S_B$; supplies predetermined signals of the transfer signals $\phi_{v1}$ to $\phi_{v4}$ from the drive ciruclt 15 to each electrode 4 at a transfer of the signal charge and supplies predetermined signals of the reverse transfer signals $\phi_{v4}$ to $\phi_{v1}$ simultaneously from the drive circuit 15 to a predetermined number of consecutive electrodes 4 (four electrodes in this case) at a reverse transfer of the signal charge. The electrode change-over switch group $S_B$ includes a plurality of (16 in this case) of switches Sb, which has an output side connected to each electrode 4. The electrodes 4 in a row of the vertical CCDs 3 are connected to the same switch Sb (FIG. 1). In a charge transfer operation, each switch Sa of the transfer reverse transfer change-over switch group $S_A$ is connected to the W side and each switch Sb of the electrode change over switch group SB is connected to the Y side. Accordingly, the transfer signals $\phi_{v1}$, $\phi_{v2}$, $\phi_{v3}$, and $\phi_{v4}$ from the drive circuit 15 are respectively supplied to the consecutive electrodes namely, $a_n$, $b_n$, $c_n$, and $d_n$, respectively, which enable the ordinary transfer of the signal charge in the vertical CCDs 3 as described above.

In the reverse transfer operation, all switches Sa of the transfer/reverse transfer change over switch group $S_A$ are connected to the X side and all switches Sb of the electrode change over switch group $S_B$ are connected to the Z side. When each switch Sa is connected to the X side, based on the transfer signals $\phi_{v1}$ to $\phi_{v4}$ produced from the drive circuit 15, there are generated the reverse transfer signals $\phi_{v4}$ to $\phi_{v1}$ having a reversed order (phase). When each switch Sb is connected to the Z side, a reverse transfer signal having the same phase is simultaneously applied to the consecutive four electrodes $a_n$ to $d_n$ in pixel.

For example, the signals $\phi_{v1}$, $\phi_{v2}$, $\phi_{v3}$ and $\phi_{v4}$ are supplied to the electrodes $a_4$ to $d_4$, $a_3$ to $d_3$, $a_2$ to $d_2$, and $a_1$ to $d_1$, respectively. In this manner a signal having the same phase is applied to each set of four electrodes so as to reversely transfer the signal charge in the vertical CCDs 3 at a high speed.

Figure 3:
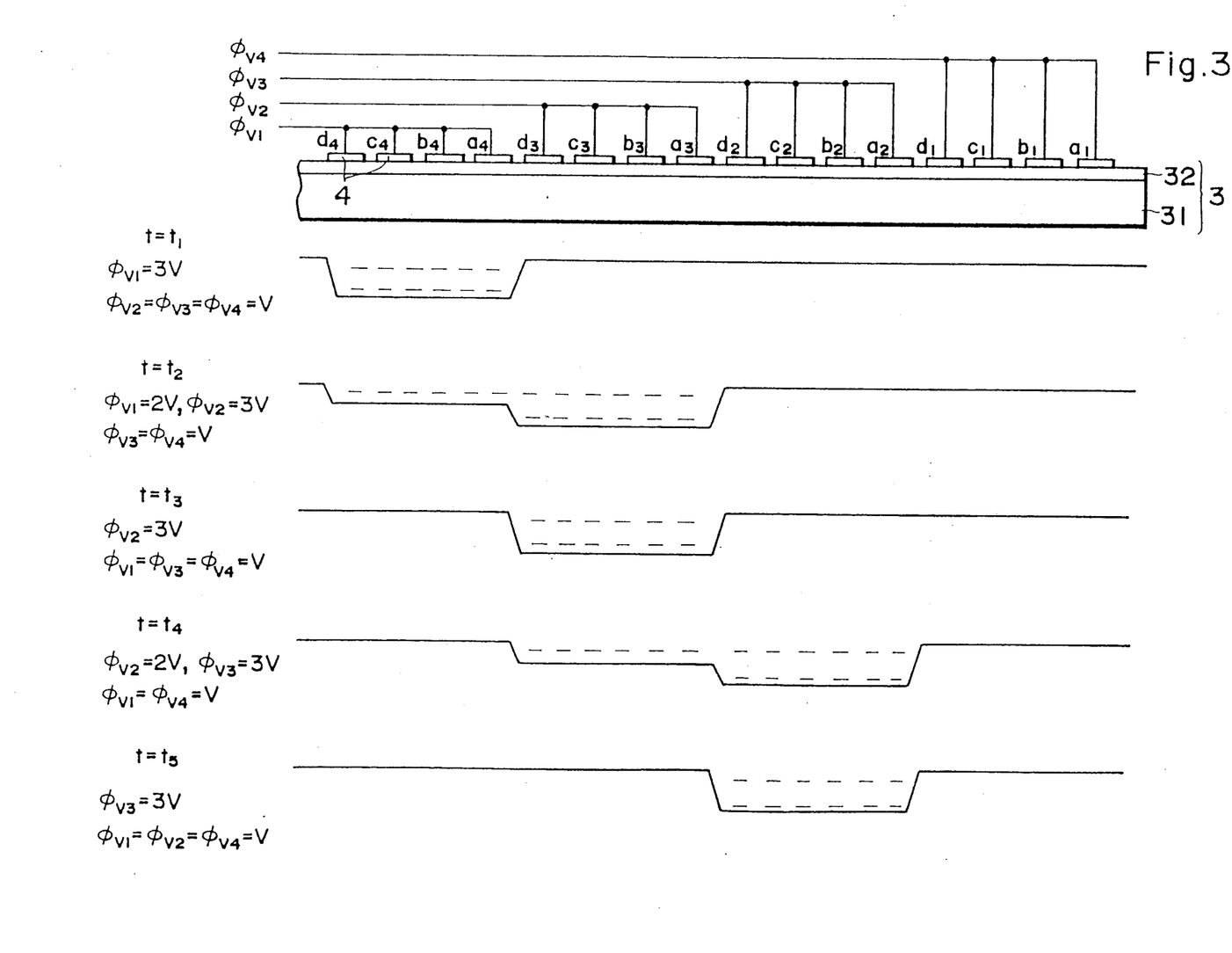
FIG. 3 is a schematic diagram of a potential profile showing a reverse transfer process of signal charge.

FIG. 3 shows a potential profile associated with a reverse transfer process of he signal charge in the reverse transfer operation.

Figure 4:
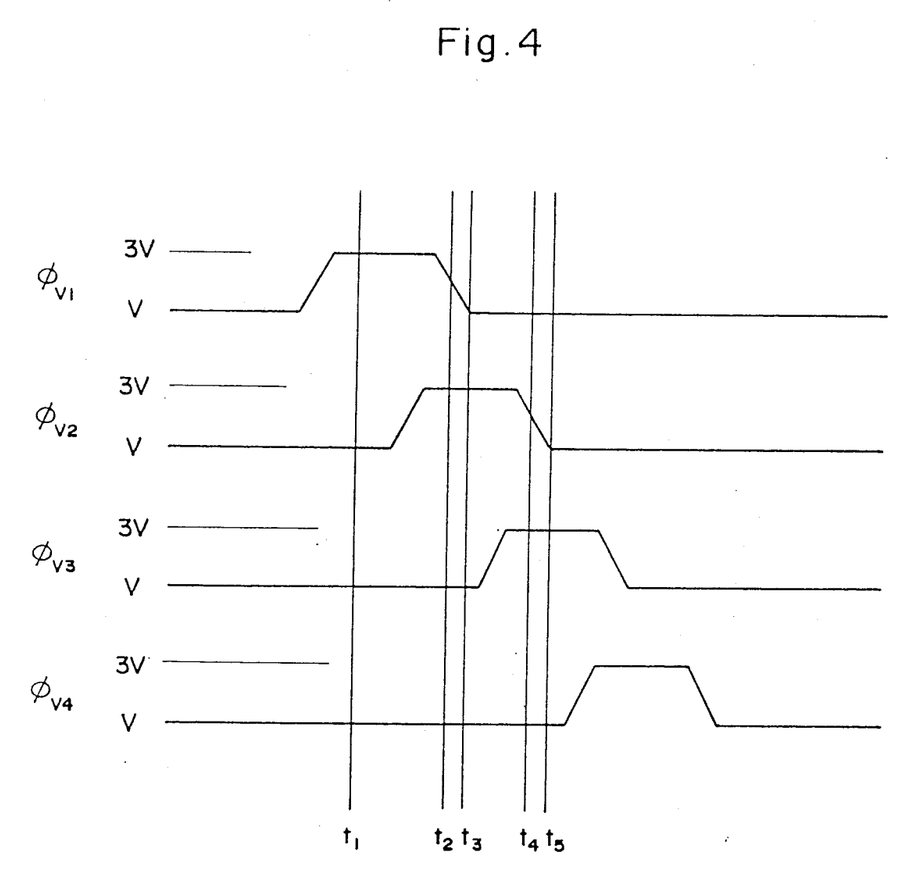
FIG. 4 is a waveform diagram of the transfer signal $\phi_{v1}$ to $\phi_{v4}$ produced from the drive circuit.

The wiring for this configuration of FIG. 3 shows a state in which all switches Sa of the transfer/reverse transfer change-over switch group $S_A$ are connected in FIG. 2 to the X side and all switches Sb of the electrode change-over switch group SB are connected to the Z side. In addition, FIG. 4 shows the transfer signals $\phi_{v1}$ to $\phi_{v4}$ produced from the drive circuit 15. Referring to the drawings above, the operation of the reverse transfer will next be described.

The electrodes 4 are formed, as shown in FIG. 3, on an insulation layer 32 disposed on an upper surface of a substrate 31. Although an upper surface of the electrode 4 is disposed with, for example, an aluminum thin layer for preventing light, such an aluminum thin layer is omitted in FIG. 3.

First, signals $\phi_{v1}=\phi_{v2}=\phi_{v3}=\phi_{v4}=V$ are supplied to all electrodes $a_n$ to $d_n$, which causes potential wells to appear in an overall region of the substrate 31 associated with the vertical CCDs 3. The signal charge accumulated in the photodiodes 1 is entirely transferred to the potential wells when the transfer gate pulse is applied to the transfer gates 2. In FIG. 3, the signal charge accumulated in the potential wells appearing n the overall region of the substrate is omitted such that only signal charge accumulated in a potential well having a greater depth is indicated in the drawings (with a minus sign, −).

At time $t=t_1$, $\phi_{v1}=3V$ is supplied to the electrodes $a_4$, $b_4$, $c_4$, and $d_4$. In this situation potential wells each having a greater depth are formed beneath the electrodes $a_4$ to $d_4$ so that electric charge is accumulated therein. At the time $t=t_2$, the voltage applied to the electrodes $a_4$ to $d_4$ is lowered to $\phi_{v1}=2V$ and then $\phi_{v2}=3V$ is applied to the electrodes $a_3$, $b_3$, $c_3$, and $d_3$. As a result, the depth of the potential wells appearing below the electrodes $A_4$ to $d_4$ becomes smaller than the depth of the potential wells formed below the electrodes $a_3$ to $d_3$. As a result the signal charge accumulated beneath the electrodes $a_4$ to $d_4$ is transferred to the potential wells beneath the electrodes $a_3$ to $d_3$. At the time $t=t_3$, the applied voltage returns to $\phi_{v1}=V$. In this manner, the signal charge moves to the adjacent pixel.

At the time $t=t_4$, the voltage applied to the electrodes $a_3$ to $d_3$ is lowered to $\phi_{v2}=2V$ and then $\phi_3=3V$ is applied to the electrodes $a_2$, to $d_2$. As described above the electric charge accumulated in the potential wells below the electrodes $a_3$ to $d_3$ is then transferred to the potential wells below the electrodes $a_2$ to $d_2$. At the time $t=t_5$, the applied voltage returns to $\phi_{v2}=V$ and terminates the transfer of the signal charge.

By repeatedly achieving the operations above, the signal charge is sequentially transferred (reversely transferred) in a direction toward the right-hand side in FIG. 3.

In the configuration above, the change-over switch group $S_A$ may be omitted if a generate circuit (a drive circuit) for generating the reverse transfer signals $\phi_{v4}$ to $\phi_{v1}$ having the opposite phases as compared with the transfer signals $\phi_{v1}$ to $\phi_{v4}$, is provided in addition to the drive circuit 15.

Although the description has been given in a case for a 4-phase drive operation, a 3-phase drive is also possible, which can be achieved with a slight modification of the change over circuit 5.

Refining now to FIG. 1, in this electronic still camera, the light measurement is accomplished for the exposure control by use of the signal charge discharged through the reverse transfer of the signal charge from the solid-state electronic imaging device. In order that the imaging plane be subdivided into several are s for the light measurement of each area (multi-light measurement), the vertical CCDs 3 are classified into several groups (three groups in this embodiment) associated with the subdivided areas. The clear or discharge terminals (opposing the terminals connected to the horizontal CCD 6) of the vertical CCDs 3 belonging to the respective groups are commonly connected to the clear or discharge lines 8, respectively. The voltage appearing in each discharge line 8 is applied to an integration circuit 14, which delivers an output to be inputted via a multiplexer 10 to an A/D converter circuit 11. The signal is therein converted into a digital signal and supplied to a CPU 12 for achieving the exposure control. The CPU 12 also effects the change-over control of the multiplexer 10, the reset processing of the integration circuits 14, and the change-over control of the switch groups $S_A$ and $S_B$ of the change-over circuit 5.

Figure 5:
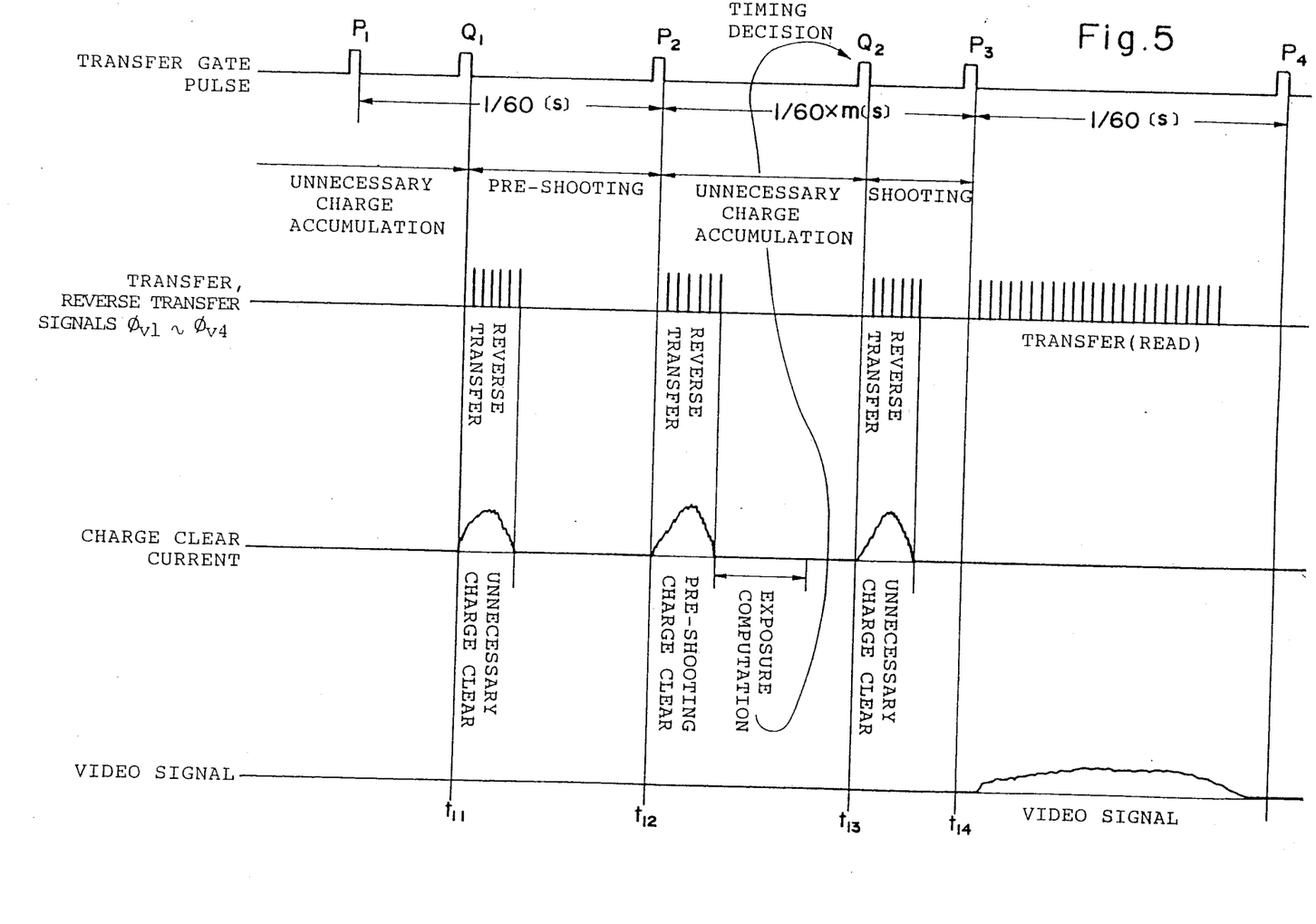
FIG. 5 is a timing chart showing an operation example of the circuit of FIG. 1.

FIG. 5 is a timing chart showing an example of the light measurement, the exposure control, and the shooting operation effected by the solid-state electronic imaging device of FIG. 1.

Referring now to FIGS. 1 and 5, the video floppy disk employed to record thereon a still video signal attained by shooting an object scene by of an electronic still camera undergoes a rotation control which turns at a rotary speed of one turn per 1/60 second. Since the rotary phase of the video floppy disk is required to be synchronized with the timing of a shooting operation, the transfer gate pulses (field shift pulses called the synchronized transfer gate pulses) $P_1$, $P_2$, $P_3$, and $P_4$ are supplied at an interval of 1/60 second therebetween. The interval between the pulses $P_2$ and $P_3$ is set to 1/60 X m (s), were m is a positive integer. In a case of m≧2, it is natural that (m—1) transfer gate pulses are supplied at an interval of 1/60 second between the pulses $P_2$ and $P_3$.

For the light measurement, there is effected a pre-shooting shooting operation. In order to accomplish the pre-shooting operation, the transfer gater pulse $Q_1$ is supplied at a timing (time $t_{11}$ between the pulses $P_1$ and $P_2$) between the synchronized transfer gate pulses. It is desirable to fixedly determine an interval between the pulse $Q_1$ and the subsequent synchronized transfer gate pulse $P_2$. Although based on the output from the light receiving element for the light measurement, the output time $t_{11}$ of the pulse $Q_1$ may be set to be variable, which mean s that the shutter speed in the pre-shooting operation is variable. A processing operation is required in which the amount of light represented by the light measurement signal supplied to the CPU 12 is converted into an amount of light per a unit of time.

When the transfer gate pulse $Q_1$ is supplied, the unnecessary charge accumulated in the photodiodes 1 prior to the time $t_{11}$ is transferred to the vertical CCDs 3. Thereafter, in response to the change-over signal from the CPU 12, the switches Sa of the transfer/-reverse transfer change-over switch group $S_A$ are connected to the X side and the switches Sb of the electrode change-over switch group $S_B$ are connected to the Z side such that the reverse transfer signals $\phi_{v4}$ to $\phi_{v1}$ are applied to the vertical CCDs 3. Thereby the unnecessary charge is severely transferred through the vertical CCDs 3 so as to discharge the signal charge as unnecessary charge through the electric charge c ear or discharge lines 8.

As described above the period of time is fixed from when the pulse $Q_1$ is delivered to when the next synchronized transfer pulse $P_2$, is outputted (the time between $t_{11}$ to $t_{12}$) and the pre-shooting operation is accomplished during this period of time such that the light measurement is effected during the pre-shooting operation.

The electric charge accumulated in the photodiodes 1 as a result of the pre-shooting operation is transferred to the vertical CCDs 3 in response to the synchronized transfer gate pulse $P_2$. Also in this situation, the vertical CCDs 3 are supplied with the reverse transfer signals $\phi_{v4}$ to $\phi_{v1}$, so that the signal charge thus accumulated is discharged through the charge clear lines 8 at a high speed as described above. The integration circuits 14 are reset at an initiation of the reverse transfer (that is, at the time $t_{11}$ when the pulse $Q_1$ is delivered). The signal charge discharged onto each charge clear line 8 is integrated in the respective integration circuit 14. When the clear operation of the signal charge is completed, the integration values fed from the respective integration cirucits 14 are sequentially supplied via the multiplexer 10 to the A/D converter 11, which converts the signal into a digital signal to be sent to the CPU 12.

Based on three integrated values for the amount of the light thus received, the CPU 12 effects the exposure control. The amount of exposure with repect to the solid-state electronic imaging device is controlled depending on the value of the iris or the diaphragm and the shutter speed. For the control of the iris value and the shutter speed based on the measured values of the amounts of incident light, the following methods are employed. In the first method, a table (a program line chart) has the optimal iris value and the optimal shutter speed which are beforehand determined, for each intensity of illumination stored in an RAM or ROM of the CPU 12. That optimal iris value and the optimal shutter speed are read from this table by using the light measurement value as a key for the read operation. According to the second method, a computation formula for attaining the optimal iris value and the optimal shutter speed is in corporated in the program of the CPU 12 such that the measured value for the amount of light is assigned to the computation formula so that the optimal iris value and the optimal shutter speed are obtained. According to this operation, in general, the optimal iris value is first attained by use of the measured amount of light and the optimal shutter speed is thereafter computed based on the iris value thus attained. It may also be possible to fix either one of the iris value or the shutter speed to adjust the other value thereof or to set both parameters to the optimal values. The adjustment of the iris value needs only to be conducted according to the known iris control. In the case of an electronic shutter, the shutter speed can be controlled by adjusting the output timing of the transfer gate pulse $Q_2$, which will be described later.

In this embodiment, the light receiving area is subdivided into three regions along the horizontal direction and the amount of incident light is separately measured for each location. Consequently, by specifying one of the three regions from input means, the amount of exposure can be controlled for the entire area based on the amount of light measured for the region, which enables the user of the camera to shoot an object scene with an optimal exposure for a desired location. It is natural for the amount of the exposure to be determined by use of the total or the average value of the measured amounts of light in the three regions.

Thereafter, when the transfer gate pulse $Q_2$ is delivered at a predetermined time $t_{13}$ (in a case of a fixed shutter speed) or at a time $t_{13}$ corresponding to the determined shutter speed, the electric charge accumulated in the photodiodes 1 from the point of time associated with the pulse $P_2$ is cleared or discharged as unnecessary charge. The period of time from the pulse $Q_2$ to the next synchronized transfer gate pulse $P_3$ (the time from $t_{13}$ to $t_{14}$) is assigned to the actual shooting operation. In this period of time, the exposure operation is achieved and then the signal charge accumulated in the photodiodes 1 is transferred to the vertical CCDs 3 when the synchronized transfer gate pulse $P_3$ is supplied to the transfer gates 2. In response to the change-over control signal from the CPU 12, the switches Sa of the transfer/reverse transfer change-over switch group SA are connected to the W side and the switches Sb of the electrode change-over switch group $S_B$ are connected to the Y side. As a result, the vertical CCDs 3 are supplied with the transfer signals $\phi_{vl}$ to $\phi_{v4}$. Consequently, the electric charge delivered to the vertical CCDs 3 is sequentially transferred to the horizontal CCD 6, which then outputs the electric charge as a video signal from the output section 7. A field of video signals is read out in a period of time of 1/60 second and undergo predetermined processing operations such as an frequency modulation as described above, thereby the signals are recorded on the video floppy disk. The horizontal CCD 6 is also supplied with a horizontal transfer signal although this is not shown in the drawings.

Figure 6:
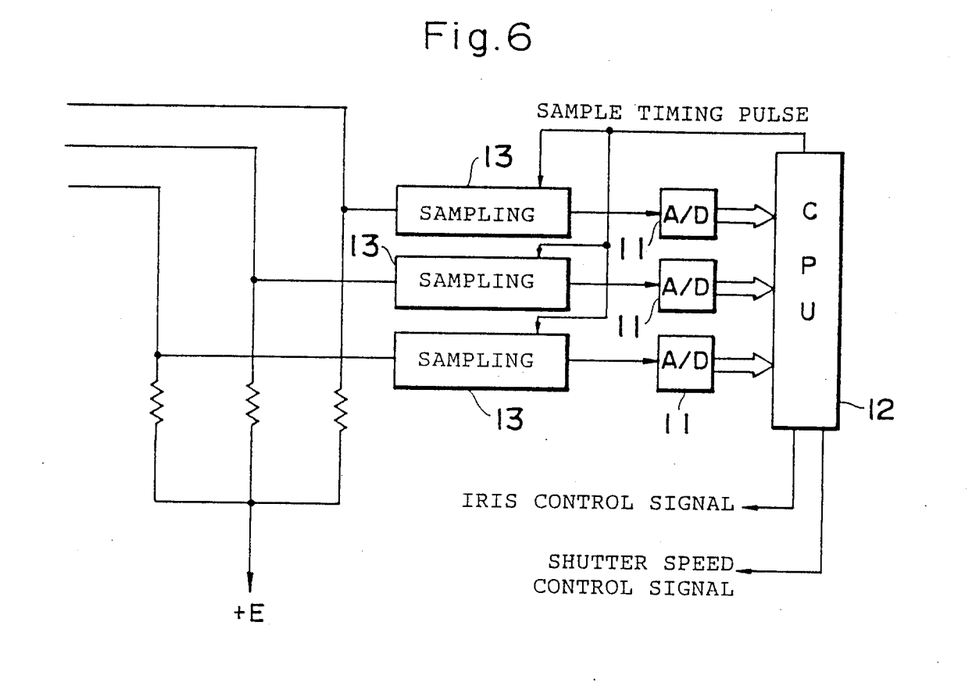
FIG. 6 is a circuit diagram showing an alternative embodiment according to the present invention.
Figure 7:
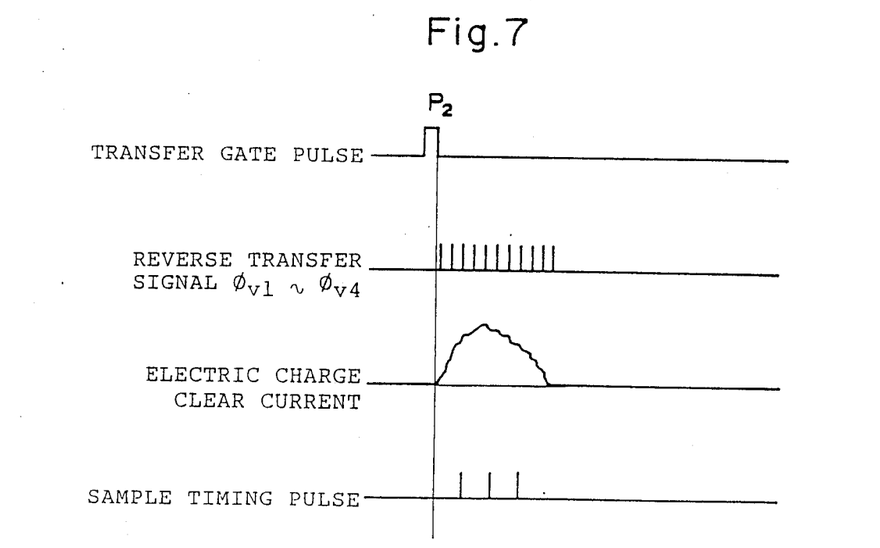
FIG. 7 is a timing chart showing an operation of the embodiment of FIG. 6.

FIGS. 6 and 7 show an alternative embodiment of to the present invention. In order to split the light measuring area into several regions along the vertical direction, sampling circuits 13 are disposed on the respective charge clear lines 8 as shown in FIG. 6. As can be seen from the timing chart of FIG. 7, while the signal charge accumulated in the pre shooting operation is being discharged through the clear lines 8, the signal charge is sampled at an appropriate sampling timing so as to be delivered via the respective A/D converter circuits 11 to the CPU 12. The sampling count is determined depending on the number of partitions along the longitudinal direction of the light receiving area. It is desirable for the signal charge to be integrated in a predetermined period of time immediately prior to the sampling operation (for example, in an interval between the sampling operations), so that the integrated the integrated value is sampled for further processing. In this case, the integration circuits are cleared for each sampling operation.

In the embodiment above, although the solid-state electronic imaging device employs an inter-line transfer system; the present invention is also applicable to other transfer systems such as a zigzag transfer system (ZT)

We claim:
1. A solid-state electronic imaging device comprising:
   drive means for developing transfer signals having predetermined phases;
   a plurality of photoelectric converter means arranged in a two dimensional array on a substrate;
   a plurality of vertical transfer means corresponding to said plurality of photoelectric converter means for transferring or reversely transferring signal electric charge which has undergone a photoelectric conversion in said plurality of photoelectric converter means in response to said transfer signals or reverse transfer signals supplied to each electrode thereof;
   horizontal transfer means for transferring in a horizontal direction the signal electric charge from said plurality of vertical transfer means; and
   change-over means having said transfer signals input thereto in response to a change-over control signal for supplying said transfer signals to each electrode of said plurality of vertical transfer means when said change-over control signal is indicative of a forward transfer and for developing said reverse transfer signals which supply each of said reverse transfer signals to each set of a predetermined number of consecutive electrodes of said vertical transfer means when said change-over control signal is indicative of a reverse transfer.

2. A solid-state electronic imaging device according to claim 1, further comprising a plurality of light measuring means for measuring signal electric charge discharged from said vertical transfer means in response to said reverse transfer signals being supplied thereto.

3. A solid-state electronic imaging device according to claim 2, wherein said vertical transfer means are subdivided into a plurality of groups, each of said plurality of light measuring means corresponds to each said group.

4. A solid-state electronic imaging device according to claim 1, wherein said vertical transfer means are subdivided into a plurality of groups, wherein each of said plurality of light measuring means corresponds to each said group.

5. A solid-state electronic imaging device according to claim 1, wherein each of said plurality of photoelectric converter means comprise a plurality of photodiodes.

6. A solid-state electronic imaging device according to claim 1, wherein each of said plurality of vertical transfer means comprise a plurality of CCDs.

7. A solid-state electronic imaging device according to claim 1, wherein said horizontal transfer means comprises a CCD.

8. A solid-state electronic imaging device according to claim 1, wherein said change-over means comprises a plurality of transfer/reverse transfer change-over switches connected to said drive means and a plurality of electrode change-over switches connected to said transfer/reverse transfer change-over switches.

9. A solid-state electronic imaging device comprising:
   drive means for developing transfer signals;
   a plurality of photoelectric converter means arrayed in a two dimensional array on a substrate;
   change-over means for developing reverse transfer signals in response to said transfer signals;
   a plurality of vertical transfer means corresponding to said plurality of photoelectric converter means for transferring or reversely transferring signal electric charge which has undergone a photoelectric conversion in said plurality of photoelectric converter means in response to said transfer signals or said reverse transfer signals supplied to each electrode thereof;
   horizontal transfer means for transferring in a horizontal direction the signal electric charge from said plurality of vertical transfer means;
   reverse transfer drive means for supplying the reverse transfer signals to each set of a predetermined number of consecutive electrodes of said vertical transfer means; and
   a plurality of light measuring means for measuring signal electric charge discharged from said vertical transfer means in response to said reverse transfer signals being supplied thereto.

10. A solid-state electronic imaging device according to claim 9, wherein each of said plurality of photoelectric converter means comprises a plurality of photodioes.

11. A solid-state electronic imaging device according to claim 9, wherein each of said plurality of vertical transfer means comprises a plurality of CCDs.

12. A solid-state electronic imaging device according to claim 9, wherein said horizontal transfer means comprises a CCD.

13. A solid-state electronic imaging device according to claim 9, wherein said change-over means comprises a plurality of transfer/reverse transfer change-over switches connected to said drive means and a plurality of electrode change-over switches connected to said transfer/reverse transfer change-over switches.

14. A method for transferring and reversely transferring signal electric charge in a solid-state imaging device, comprising the steps of:
   developing transfer signals;
   developing reverse transfer signals in response to said transfer signals;
   transferring or reversely transferring signal electric charge which has undergone a photoelectric conversion in a plurality of photoelectric converter means by a plurality of vertical transfer means corresponding to said plurality of photoelectric converter means in response to said transfer signals or said reverse transfer signals supplied to each electrode thereof;

transferring in a horizontal direction the signal electric charge from said plurality of vertical transfer means;

supplying the reverse transfer signals to each set of a predetermined number of consecutive electrodes of said vertical transfer means; and measuring signal electric charge discharged from said vertical transfer means in response to said reverse transfer signals being supplied therto.

* * * * *